United States Patent
Mach et al.

(10) Patent No.: US 8,682,521 B2
(45) Date of Patent: Mar. 25, 2014

(54) UNPREDICTABLE VEHICLE NAVIGATION

(75) Inventors: Kimberly Mach, Renton, WA (US); Robert P. Lutter, Tacoma, WA (US); Trevor Lee Olson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/532,537

(22) Filed: Jun. 25, 2012

(65) Prior Publication Data
US 2013/0345919 A1    Dec. 26, 2013

(51) Int. Cl.
*G01C 21/00* (2006.01)
*G06F 17/30* (2006.01)

(52) U.S. Cl.
USPC .......... 701/23; 701/4; 701/26; 434/11

(58) Field of Classification Search
USPC .......... 701/23, 3, 4, 10, 26, 467; 434/11
See application file for complete search history.

(56) References Cited

U.S. PATENT DOCUMENTS

| | | | |
|---|---|---|---|
| 7,228,227 B2 * | 6/2007 | Speer | 701/467 |
| 2005/0090972 A1 | 4/2005 | Bodin et al. | |
| 2006/0106506 A1 * | 5/2006 | Nichols et al. | 701/3 |
| 2006/0121418 A1 * | 6/2006 | DeMarco et al. | 434/11 |
| 2007/0285041 A1 | 12/2007 | Jones et al. | |
| 2009/0157293 A1 | 6/2009 | Cornett et al. | |
| 2010/0017114 A1 * | 1/2010 | Tehan et al. | 701/202 |

FOREIGN PATENT DOCUMENTS

| | | |
|---|---|---|
| EP | 1995560 A2 | 11/2008 |
| EP | 2261762 A2 | 12/2010 |

OTHER PUBLICATIONS

Bryson et al., "An Information-Theoretic Approach to Autonomous Navigation and Guidance of an Uninhabited Aerial Vehicle in Unknown Environments," IEEE/RSJ International Conference on Intelligent Robots and Systems, Aug. 2005, pp. 3770-3775.
Marzouqi et al., "Covert Robotics: Hiding in Known Environments," Proceedings of the 2004 IEEE Conference on Robotics, Automation and Mechatronics, Dec. 2004, pp. 804-809.
Root et al., "Randomized Path Planning with Deceptive Strategies," 2005 American Control Conference, Jun. 2005, pp. 1551-1556.
Extended European Search Report, dated Oct. 30, 2013, regarding Application No. EP13172851.1, 6 pages.

* cited by examiner

*Primary Examiner* — Tan Q Nguyen
(74) *Attorney, Agent, or Firm* — Yee & Associates, P.C.

(57) ABSTRACT

A system and method for controlling movement of a vehicle. A current state of the vehicle is identified. The current state comprises a current location of the vehicle. A next state for the vehicle is selected by a processor unit. The next state comprises a next location for the vehicle. A value for an attribute of the next state of the vehicle is randomly selected. The movement of the vehicle is controlled to move the vehicle from the current state to the next state.

22 Claims, 11 Drawing Sheets

UNPREDICTABLE VEHICLE NAVIGATION

BACKGROUND INFORMATION

1. Field

The present disclosure relates generally to systems and methods for controlling the movement of a vehicle. More particularly, the present disclosure relates to automatically controlling the movement of a vehicle in an unpredictable manner.

2. Background

Manned and unmanned air vehicles may be used to perform a variety of military and other missions. For example, one type of mission that may be performed by an air vehicle is a surveillance mission. In this case, the air vehicle may be flown from a base location to a location near a point of interest. The air vehicle then may be flown in an area near the point of interest while surveillance equipment on the air vehicle is trained on the point of interest. The surveillance equipment may include, for example, imaging systems and other systems on board the air vehicle for obtaining information about the point of interest.

The point of interest that is the target of a surveillance mission or other mission by an air vehicle may be stationary or moving. For example, the point of interest may be a building, a fixed weapon system, or another stationary military, industrial, or other object of interest. Alternatively, the point of interest may be a moving person, a vehicle, a convoy of vehicles, or another moving object of interest.

Various constraints may limit the manner in which an air vehicle may be controlled to perform a mission in an area near a point of interest. These constraints may be imposed, for example, by the capabilities of the air vehicle, by the capabilities of equipment on the air vehicle that is being used to perform the mission, by weather or other environmental conditions, by particular details of the mission to be performed, or by other factors or combinations of factors.

The performance capabilities of an air vehicle may limit the altitude and speed at which the air vehicle may be flown in an area near the point of interest during a mission. Capabilities of surveillance equipment or other equipment on board the air vehicle may dictate the maximum distance from the point of interest at which the air vehicle may be flown while performing a surveillance mission or other mission.

Topography, weather, or other environmental conditions may limit the area near a point of interest that may be used by an air vehicle to perform a mission. For example, a storm, enemy radar emplacements, or other conditions or combinations of conditions may create "no-fly zones" near the point of interest through which an air vehicle should not be flown. Time on station limitations, surveillance image quality requirements, or other particular requirements of a surveillance mission or other mission also may constrain how an air vehicle is flown in an area near a point of interest during the mission.

It may be desirable that an air vehicle is not detected by hostile forces as the air vehicle performs a mission in an area near a point of interest. Detection of an air vehicle performing a mission near the point of interest may allow hostile forces to take action to thwart the mission. For example, in response to detecting the presence of an air vehicle flying near the point of interest, objects of interest may be moved or hidden by hostile forces in an attempt to prevent successful completion of a surveillance mission by the air vehicle.

Detection of the presence of an air vehicle performing a mission near a point of interest may lead to an attack on the air vehicle by hostile forces. Such an attack may force the air vehicle to abandon the mission. In the worst case, such an attack may lead to loss of the air vehicle.

Current systems and methods for controlling the flight of an air vehicle may provide little, if any, help to a pilot controlling the movement of the air vehicle in a manner that satisfies the various constraints for performing a mission in an area near a point of interest. Currently, automated navigation systems may be used for controlling the flight of an air vehicle from one location to another location. In the context of performing a mission in an area near a point of interest, an automated navigation system may be used to control automatically the flight of the air vehicle from a base location to a location near the point of interest. However, current automated navigation systems are not adapted for controlling the movement of an air vehicle in an area near a point of interest to perform a surveillance mission or other mission in the area. In particular, current systems and methods for controlling the movement of an air vehicle in an area near a point of interest may not reduce the likelihood that the air vehicle is detected by hostile forces while performing a mission in the area.

Accordingly, it would be beneficial to have a method and apparatus that takes into account one or more of the issues discussed above as well as possibly other issues.

SUMMARY

An illustrative embodiment of the present disclosure provides a method for controlling movement of a vehicle. A current state of the vehicle is identified. The current state comprises a current location of the vehicle. A next state for the vehicle is selected by a processor unit. The next state comprises a next location for the vehicle. A value for an attribute of the next state of the vehicle is randomly selected. The movement of the vehicle is controlled to move the vehicle from the current state to the next state.

Another illustrative embodiment provides an apparatus comprising a processor unit configured to identify a current state of a vehicle, select a next state for the vehicle, and randomly select a value for an attribute of the next state of the vehicle. The current state comprises a current location of the vehicle. The next state comprises a next location for the vehicle.

Another illustrative embodiment provides another method for controlling movement of a vehicle. A current state of the vehicle is identified. The current state comprises a current location of the vehicle.

Possible next states for the vehicle are identified by a processor unit. State values for the possible next states are identified by the processor unit. The state values are a function of times that the vehicle was in the possible next states. A next state for the vehicle is selected from the possible next states using the state values. The next state comprises a next location for the vehicle.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

Figure 1:
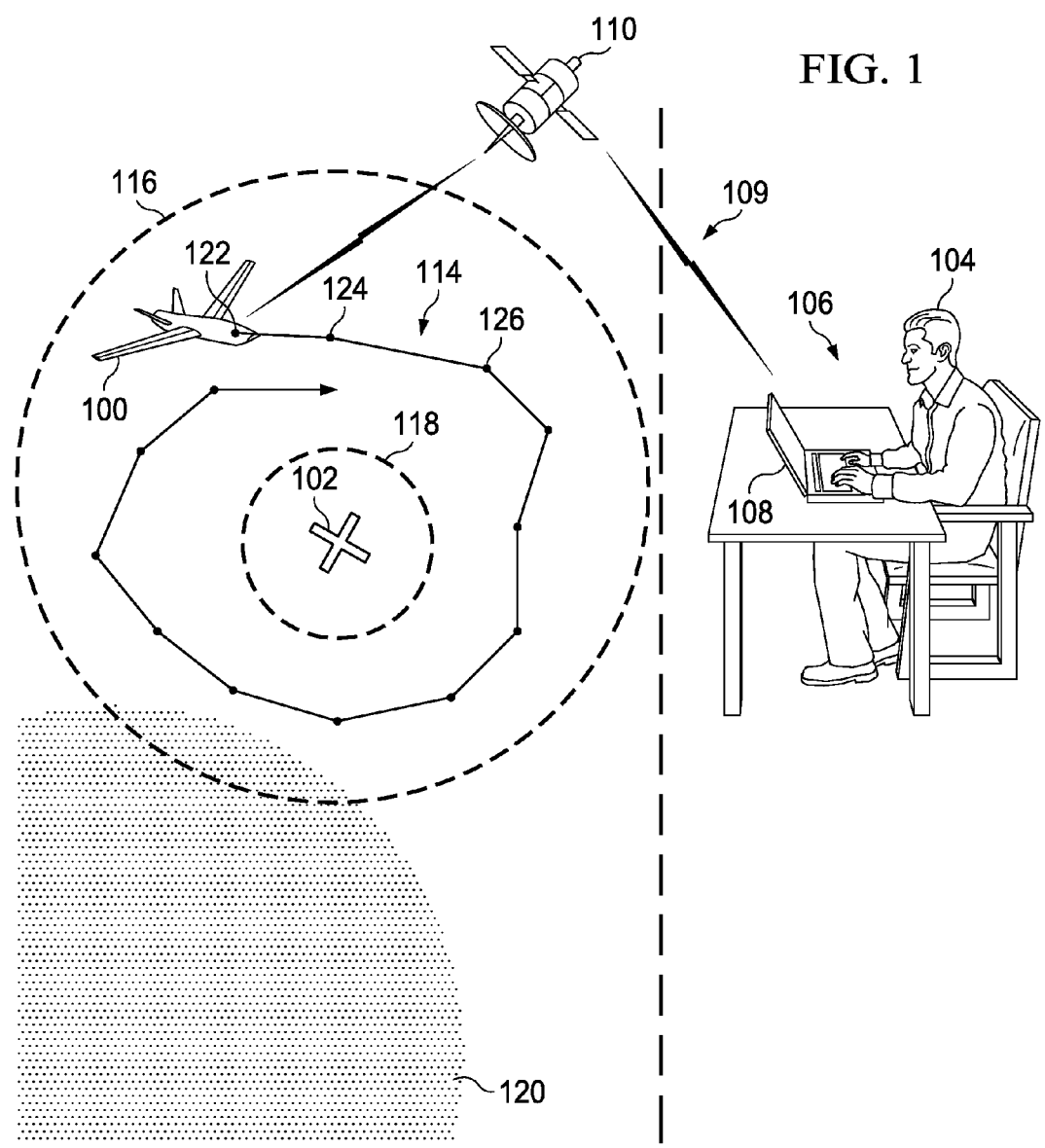
FIG. 1 is an illustration of unpredictable navigation of an unmanned air vehicle in accordance with an illustrative embodiment.

The different illustrative embodiments recognize and take into account a number of different considerations. "A number", as used herein with reference to items, means one or more items. For example, "a number of different considerations" means one or more different considerations.

The different illustrative embodiments recognize and take into account that an air vehicle may be moved from a base location to a location near a point of interest to perform a surveillance mission. The air vehicle may be placed in a static flight path around the point of interest after the vehicle arrives at a location where surveillance sensors on the air vehicle can see the point of interest. The air vehicle may repeat the same flight path around the point of interest until enough information has been gathered. The different illustrative embodiments recognize and take into account that an air vehicle that is flown in a repeated pattern around a point of interest may be more likely to be detected by hostile forces. The use of a repeated flight path around a point of interest has resulted in the loss of air vehicles to hostile action in the past.

The different illustrative embodiments also recognize and take into account that a current procedure for reducing the likelihood that an air vehicle flying in an area near a point of interest is detected by hostile forces is for the pilot of the air vehicle to manually vary the flight path of the vehicle near the point of interest. However, piloting an air vehicle on a flight path that is continually varying and non-repeating creates an operational burden on the pilot and increases pilot fatigue. As a result, it may be difficult for the pilot to maintain a flight path for the air vehicle that does not repeatedly pass through or near the same point several times during the performance of a surveillance mission or other mission in an area near the point of interest.

The different illustrative embodiments also recognize and take into account that a pilot also may have to manually adjust the flight path of an air vehicle near a point of interest in order to avoid no-fly zones or to satisfy other constraints. Manually adjusting the flight path of an air vehicle to satisfy such constraints may further increase pilot fatigue.

The different illustrative embodiments also recognize and take into account that current systems and methods for controlling the flight of an air vehicle with respect to a point of interest may assume that the point of interest is stationary. Current systems and methods for controlling the flight of an air vehicle with respect to a point of interest may not be adapted to adjust the flight path of the air vehicle in response to movement of the point of interest during the performance of a surveillance mission or other mission at the point of interest.

The different illustrative embodiments provide a system and method for controlling the movement of a vehicle, such as an air vehicle, in an area near a point of interest in a manner that reduces the likelihood that the vehicle may be detected by hostile forces while also satisfying various mission constraints. In accordance with an illustrative embodiment, a vehicle may be controlled to move in an unpredictable pattern in an area near the point of interest. An algorithm may be employed to automatically control the movement of the vehicle in a manner that minimizes a number of times that the vehicle presents the same state during the performance of a mission in the area near the point of interest. For example, an air vehicle that is controlled to fly an unpredictable flight path may mimic natural objects, thereby enabling the air vehicle to hide in natural clutter. In accordance with an illustrative embodiment, the movement of the vehicle in the area near the point of interest may be adjusted automatically in response to movement of the point of interest during the performance of a mission by the vehicle at the point of interest.

Turning first to FIG. 1, an illustration of unpredictable navigation of an unmanned air vehicle is depicted in accordance with an illustrative embodiment. In this illustrative example, unmanned air vehicle 100 is performing a surveillance mission or other mission with respect to point of interest 102. Point of interest 102 may be stationary or moving.

Movement of unmanned air vehicle 100 may be controlled by operator 104. Operator 104 may be a human pilot or other operator at remote location 106. Remote location 106 may be any location that is not on unmanned air vehicle 100. Operator 104 may use remote control system 108 at remote location 106 to control the movement of unmanned air vehicle 100. Remote control system 108 may be in communication with unmanned air vehicle 100 via communications link 109. Communications link 109 may include any appropriate communications link for providing signals between remote control system 108 and unmanned air vehicle 100 for controlling unmanned air vehicle 100. For example, without limitation, remote control system 108 may be in communication with unmanned air vehicle 100 via communications link 109 including satellite 110, or using any other appropriate communications link.

In accordance with an illustrative embodiment, operator 104 may engage and disengage an automatic navigation system for controlling the movement of unmanned air vehicle 100 in an area near point of interest 102. When the automatic navigation system is engaged, unmanned air vehicle 100 may be controlled automatically to move along an unpredictable flight path in the area near point of interest 102. When the automatic navigation system is disengaged, operator 104 may manually control the movement of unmanned air vehicle 100 via remote control system 108.

In accordance with an illustrative embodiment, unmanned air vehicle 100 may be controlled to follow flight path 114 while performing a mission in the area near point of interest 102. Flight path 114 may be non-repeating and unpredictable. For example, flight path 114 may be determined by the automatic navigation system in a manner such that the number of times that unmanned air vehicle 100 passes through the same point, or otherwise presents the same state of movement, during the course of performing a mission at point of interest 102 is minimized. Unmanned air vehicle 100 following flight path 114 is less likely to be detected by hostile forces.

Flight path 114 for unmanned air vehicle 100 also may satisfy various constraints that may be imposed for the mission being performed by unmanned air vehicle 100 in the area near point of interest 102. For example, one such constraint may require that unmanned air vehicle 100 be no further from point of interest 102 than the distance indicated by dashed line 116 and that unmanned air vehicle 100 is no closer to point of interest 102 than the distance indicated by dashed line 118 while the mission is being performed by unmanned air vehicle 100. Accordingly, in this example, flight path 114 for unmanned air vehicle 100 may be automatically limited to the area in the range of distances from point of interest 102 between dashed lines 116 and 118.

In this example, no-fly zone 120 has been identified in the area near point of interest 102. For example, without limitation, no-fly zone 120 may be an area under surveillance by enemy radar systems, an area across an international border, or any other area through which unmanned air vehicle 100 should not pass during the performance of the mission at point of interest 102. In accordance with an illustrative embodiment, flight path 114 for unmanned air vehicle 100 may be automatically constrained to avoid no-fly zone 120.

The various constraints that may be used for determining flight path 114 for unmanned air vehicle 100 may be identified before unmanned air vehicle 100 is deployed to the area near point of interest 102. The various constraints that may be used for determining flight path 114 for unmanned air vehicle 100 also may be established or changed during the time that unmanned air vehicle 100 is on station performing the mission at point of interest 102. In accordance with an illustrative embodiment, flight path 114 for unmanned air vehicle 100 may be automatically adjusted to satisfy any such constraints that may be established or changed during the time that unmanned air vehicle 100 is on station performing a mission in the area near point of interest 102.

For example, such constraints may be established or changed by operator 104 when unmanned air vehicle 100 is on station near point of interest 102. For example, without limitation, operator 104 may establish no-fly zone 120, change the extent of no-fly zone 120, or eliminate no-fly zone 120 while unmanned air vehicle 100 is in flight near point of interest 102.

As another example, such constraints may change automatically during the time that unmanned air vehicle 100 is on station performing the mission at point of interest 102. For example, without limitation, no-fly zone 120 may automatically change over time. As one example, without limitation, no-fly zone 120 may be associated with a moving weather condition, a moving vehicle, or some other moving or otherwise changing object or condition. In this case, no-fly zone 120 may automatically move or otherwise change shape or size, or both, as the condition or object associated with no-fly zone 120 moves or otherwise changes during the time that unmanned air vehicle 100 is performing a mission in the area near point of interest 102.

As will be described in more detail below, in accordance with an illustrative embodiment, flight path 114 may be automatically determined by identifying a current state of unmanned air vehicle 100 and then automatically selecting a next state for unmanned air vehicle 100 that may best satisfy various criteria. The current state of unmanned air vehicle 100 may include a current location of unmanned air vehicle 100. The next state for unmanned air vehicle 100 may include a next location for unmanned air vehicle 100. Unmanned air vehicle 100 then may be controlled to move from the first state to the second state.

The criteria that is used to select the next state for unmanned air vehicle 100 may include, for example, minimizing the likelihood that unmanned air vehicle 100 is in the same state repeatedly during the performance of a mission at point of interest 102. Satisfying the criteria results in flight path 114 for unmanned air vehicle 100 that is non-repeating and, therefore, unpredictable. An unpredictable flight path reduces the likelihood that unmanned air vehicle 100 is detected by hostile forces during the performance of a mission in the area near point of interest 102.

Other criteria that may be used to select the next state for unmanned air vehicle 100 may include criteria related to various mission constraints. Such other criteria may prevent the next state for unmanned air vehicle 100 from being selected as any state that may violate such constraints.

In the example illustrated, unmanned air vehicle 100 is in a current state at point 122. The next state for unmanned air vehicle 100 is selected to be at point 124. Unmanned air vehicle 100 may be controlled automatically to move from point 122 to point 124. When unmanned air vehicle 100 moves to point 124, the state of unmanned air vehicle 100 at point 124 becomes the current state. The next state for unmanned air vehicle 100 then may be selected to be at point 126, and so on, to form flight path 114 for unmanned air vehicle 100. Flight path 114 does not repeatedly pass through or near the same point and is, therefore, unpredictable. Flight path 114 also satisfies the constraints of remaining in the area between dashed lines 116 and 118 and not entering no-fly zone 120.

Figure 2:
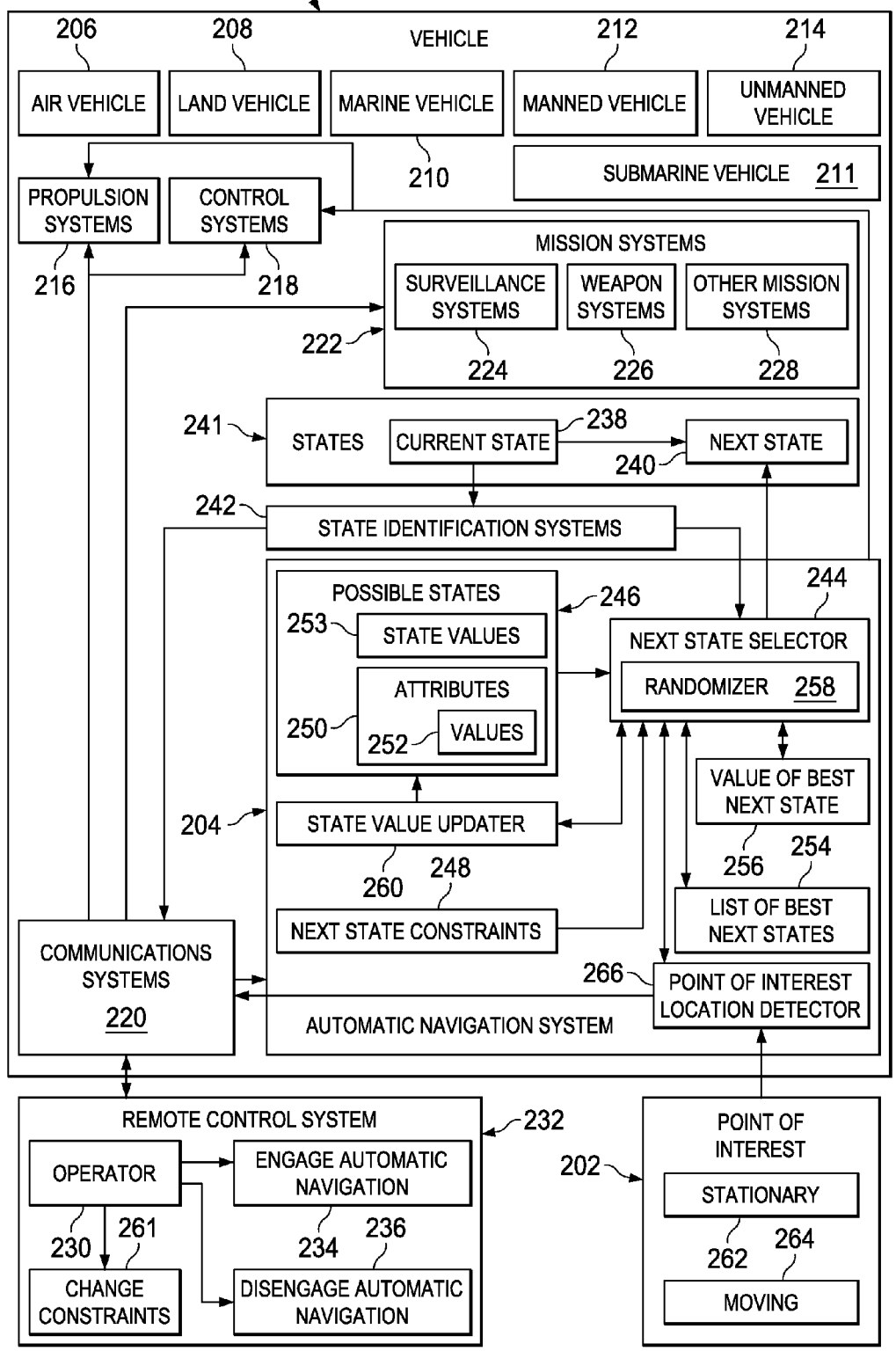
FIG. 2 is an illustration of a block diagram of a vehicle and an automatic navigation system in accordance with an illustrative embodiment.

Turning now to FIG. 2, an illustration of a block diagram of a vehicle and automatic navigation system is depicted in accordance with an illustrative embodiment. Vehicle 200 may be any vehicle for performing a mission in an area near point of interest 202. In accordance with an illustrative embodiment, automatic navigation system 204 is configured to automatically move vehicle 200 in the area near point of interest 202 in an unpredictable manner that reduces the likelihood that vehicle 200 may be detected by hostile forces while also satisfying any constraints for successfully completing the mission at point of interest 202.

Vehicle 200 may be air vehicle 206, land vehicle 208, marine vehicle 210, or submarine vehicle 211. Air vehicle 206 may be any vehicle configured for traveling through the air. For example, air vehicle 206 may include a fixed wing, rotary wing, or lighter than air aircraft. Unmanned air vehicle 100 in FIG. 1 is an example of one implementation of air vehicle 206. Land vehicle 208 may include any vehicle configured for traveling on land. Marine vehicle 210 may include any vehicle configured for traveling on the surface of water. Submarine vehicle 211 may include any vehicle configured for travelling beneath the surface of water.

Vehicle 200 may be any vehicle configured for traveling in any medium or in various combinations of media. For example, without limitation, vehicle 200 may be an amphibious vehicle configured for traveling on both land and water. As another example, vehicle 200 may be an aerospace vehicle configured for traveling through the air and in outer space.

Vehicle 200 also may be manned vehicle 212 or unmanned vehicle 214. Manned vehicle 212 may include any vehicle that is controlled by a human operator located on vehicle 200. Unmanned vehicle 214 may include any vehicle that is controlled by an operator that is not located on vehicle 200. Unmanned air vehicle 100 in FIG. 1 is an example of one implementation of unmanned vehicle 214

Vehicle 200 may include various systems for operation of vehicle 200 to perform a mission in the area near point of interest 202. For example, without limitation, vehicle 200 may include propulsion systems 216, control systems 218, communications systems 220, and mission systems 222.

Propulsion systems 216 may include any systems configured for moving vehicle 200. Propulsion systems 216 may be appropriate for the type of vehicle 200 and the media on or through which vehicle 200 is to be moved. For example, without limitation, for air vehicle 206, propulsion systems 216 may include propellers, jet engines, or other appropriate systems for moving vehicle 200 through the air.

Control systems 218 may include any systems for controlling the movement of vehicle 200. For example, without limitation, control systems 218 may be configured to control the direction of movement of vehicle 200, the speed of movement of vehicle 200, the orientation of vehicle 200, or other characteristics or combinations of characteristics of the movement of vehicle 200. Control systems 218 may be appropriate for the type of vehicle 200 and the various ways in which the movement of vehicle 200 may be controlled. For example, without limitation, for air vehicle 206, control systems 218 may include various moveable flight control surfaces such as rudders, flaps, and ailerons.

In some cases, propulsion systems 216 and control systems 218 may be combined, in whole or in part. For example, without limitation, for a helicopter or other rotary wing air vehicle, a main rotor may be used to propel the vehicle through the air and may be controlled to control the movement of the vehicle through the air. In this example, the main rotor is part of both propulsion systems 216 and control systems 218 for the rotary wing air vehicle.

Communications systems 220 may include any systems configured to provide for the communication of voice, data, or both to and from vehicle 200. Communications systems 220 may include systems configured to provide communications between vehicle 200 and any other vehicle or location. For example, without limitation, communications systems 220 may include systems for providing communications for vehicle 200 via satellite communication links or using any other communications media and protocols or any combination of communications devices, media, and protocols.

Mission systems 222 may include a number of various systems on vehicle 200 that may be used to perform a mission at point of interest 202. For example, mission systems 222 may include surveillance systems 224, weapon systems 226, other mission systems 228, or various combinations of systems for performing various missions in an area near point of interest 202.

Surveillance systems 224 may include any systems on vehicle 200 for performing surveillance, intelligence, or reconnaissance missions. For example, without limitation, surveillance systems 224 may include imaging systems that may be operated at any frequency for obtaining imagery at point of interest 202. As another example, surveillance systems 224 may include radar systems, sonar systems, or passive systems for detecting radio frequency or other signals at point of interest 202.

Weapon systems 226 may include any systems that may be deployed or operated from vehicle 200 to inflict damage at point of interest 202. Other mission systems 228 may include other systems that may be particularly useful for certain missions at point of interest 202. For example, without limitation, for a search and rescue mission, other mission systems 228 may include communications systems 220 for maintaining radio communications with a downed aircrew or other party at point of interest 202 until additional help can arrive.

The particular mission systems 222 that may be on vehicle 200 may depend upon the nature and requirements of the particular mission to be performed. The mission to be performed by vehicle 200 may have multiple objectives. In this case, multiple different types of mission systems 222 may be provided on vehicle 200 for the mission. For example, without limitation, the mission to be performed by vehicle 200 may be to obtain intelligence at point of interest 202 and, depending on the intelligence, to inflict damage at point of interest 202. In this case, mission systems 222 on vehicle 200 may include both surveillance systems 224 and weapon systems 226.

Operation of vehicle 200 to perform a mission in a location near point of interest 202 may be controlled manually by operator 230. For example, operator 230 may manually control propulsion systems 216 and control systems 218 to control the movement of vehicle 200 to and around in the area near point of interest 202.

Mission systems 222 may operate automatically or in combination with operator 230. Operator 230 may manually control the operation of mission systems 222. For example, without limitation, operator 230 may manually activate and deactivate surveillance systems 224, deploy weapon systems 226, control other mission systems 228, or control various combinations of mission systems 222 in the course of performing a mission in the area near point of interest 202.

In the case where vehicle 200 is unmanned vehicle 214, operator 230 may control operation of vehicle 200 from remote control system 232. Remote control system 232 may be located at any location that is not on vehicle 200. Remote control system 232 may be in communication with vehicle 200 via communications systems 220. Control operations performed by operator 230 at remote control system 232 may generate appropriate control signals for controlling operation of vehicle 200. These control signals may be provided from remote control system 232 to propulsion systems 216, control systems 218, and mission systems 222 on vehicle 200, as appropriate, via communications systems 220.

In the case where vehicle 200 is manned vehicle 212, operator 230 may control operation of vehicle 200 from onboard vehicle 200. In this case, vehicle 200 may include the appropriate control interfaces onboard vehicle 200 for operator 230 to control propulsion systems 216, control systems 218, and mission systems 222 in an appropriate manner to perform a mission in the area near point of interest 202.

In accordance with an illustrative embodiment, automatic navigation system 204 may be configured to control automatically the movement of vehicle 200 in an area near point of interest 202 to perform a desired mission. Automatic navigation system 204 may be configured to control vehicle 200 to move in an unpredictable manner, so that it is less likely that the movement of vehicle 200 in the area near point of interest 202 is detected by hostile forces. Automatic navigation system 204 also may be configured to control the movement of vehicle 200 in an area near point of interest 202 in a manner that satisfies various constraints associated with the mission being performed.

In accordance with an illustrative embodiment, operator 230 may engage automatic navigation 234 or disengage automatic navigation 236. For example, without limitation, signals indicating the decision of operator 230 to engage automatic navigation 234 or to disengage automatic navigation 236 may be provided to automatic navigation system 204 from remote control system 232 via communications systems 220 on vehicle 200. In response to receiving a signal to engage automatic navigation 234, automatic navigation system 204 may begin automatically controlling the movement of vehicle 200 in the area near point of interest 202. In response to receiving a signal to disengage automatic navigation 236, automatic navigation system 204 may stop automatically controlling the movement of vehicle 200. Thus, in response to receiving the signal to disengage automatic navigation 236, control of the movement of vehicle 200 may be returned from automatic control to manual control by operator 230.

In accordance with an illustrative embodiment, automatic navigation system 204 may control the movement of vehicle 200 by identifying current state 238 of vehicle 200, selecting next state 240 of vehicle 200 using an appropriate algorithm, and then automatically controlling the movement of vehicle 200 from current state 238 to next state 240. Current state 238 and next state 240 are examples of states 241 of vehicle 200. States 241 of vehicle 200 are defined by the values of various attributes that describe vehicle 200 as vehicle 200 is moving in the area near point of interest 202 to perform a mission. For example, without limitation, states 241 may include locations of vehicle 200 in the area near point of interest 202. Other attributes that may define states 241 of vehicle 200 may include, without limitation, speeds of vehicle 200, altitudes of vehicle 200, orientations of vehicle 200, or other attributes or various combinations of such attributes. In particular, attributes of vehicle 200 that may be related to the detectability of vehicle 200 as vehicle 200 moves in the area near point of interest 202 may be used to define states 241 of vehicle 200.

Current state 238 of vehicle 200 may be identified using state identification systems 242. State identification systems 242 may include any devices or systems for identifying the current values of various attributes of vehicle 200 as vehicle 200 moves in the area near point of interest 202. For example, without limitation, state identification systems 242 may include a satellite-based global positioning system or other system for identifying the current location of vehicle 200. State identification systems 242 also may include an altimeter for identifying the current altitude of vehicle 200. Further, state identification systems 242 may include other systems and devices for identifying the current values of other attributes of vehicle 200 that define current state 238.

The values of the various attributes that define current state 238 of vehicle 200 may be provided from state identification systems 242 to automatic navigation system 204 for use in selecting next state 240 of vehicle 200. Some or all of the information identifying current state 238 of vehicle 200 also may be provided from state identification systems 242 to operator 230. For example, without limitation, such information may be provided from state identification systems 242 to remote control system 232 via communications systems 220. Such information may then be displayed or otherwise presented to operator 230 at remote control system 232.

Automatic navigation system 204 may include next state selector 244. Next state selector 244 is configured to identify next state 240 for vehicle 200. In accordance with an illustrative embodiment, next state selector 244 is configured to select next state 240 from possible states 246 based on current state 238 of vehicle 200, as identified by state identification systems 242, and next state constraints 248.

Possible states 246 are states for vehicle 200 that vehicle 200 may be moved into. Possible states 246 may be defined by various attributes 250 of vehicle 200 and various possible values 252 for attributes 250. For example, without limitation, attributes 250 may include the location, speed, and altitude of vehicle 200. In this case, values 252 may include values indicating various possible locations of vehicle 200 in the area near point of interest 202 and various possible speeds and altitudes for vehicle 200 at those locations. Possible states 246 may include other or additional attributes 250 for vehicle 200. Values 252 for attributes 250 of possible states 246 may be ranges of values.

Possible states 246 also may be defined by state values 253. State values 253 are values associated with each of possible states 246. State values 253 may indicate the desirability for selecting individual ones of possible states 246 for next state 240. As will be discussed in more detail below, state values 253 may be determined based on weights associated with attributes 250 of possible states 246. The weights may indicate the amount of time since vehicle 200 was in each of possible states 246 and reflect the number of times that vehicle 200 has had certain values 252 of attributes 250 associated with those possible states 246.

In accordance with an illustrative embodiment, next state selector 244 may identify possible next states for vehicle 200 from possible states 246. Such possible next states may be identified as ones of possible states 246 to which vehicle 200 may be moved from current state 238 given various next state constraints 248. Next state constraints 248 may include various constraints on the movement of vehicle 200 due to the operational capabilities of vehicle 200 and as may be required for the performance of a particular mission in the area near point of interest 202.

Next state constraints 248 may include requirements for maintaining vehicle 200 within a certain range of distances or in another relationship with respect to point of interest 202. Point of interest 202 may be stationary 262 or moving 264. Point of interest location detector 266 may be used to identify the current location of point of interest 202. The location of point of interest 202 as identified by point of interest location detector 266 may be provided to next state selector 244 for use in selecting next state 240 that satisfies next state constraints 248 related to the current position of point of interest 202. The location of point of interest 202 identified by point of interest location detector 266 also may be provided to operator 230. For example, the location of point of interest 202 may be provided to operator 230 on remote control system 232 via communications systems 220.

Next state constraints 248 may be established prior to vehicle 200 undertaking a mission in an area near point of interest 202. Some or all of next state constraints 248 also may be changed while vehicle 200 is in operation in an area near point of interest 202. For example, without limitation, next state constraints 248 may be changed by operator 230 during operation of vehicle 200 in the area near point of interest 202. Such changes to next state constraints 248 may be provided by operator 230 from remote control system 232 to automatic navigation system 204 via communications systems 220. For example, without limitation, next state constraints 248 may include a no-fly zone through which vehicle 200 should not be moved while performing a mission. In this case, the no-fly zone may be established, changed, or cancelled by operator 230 while vehicle 200 is on location performing a mission near point of interest 202.

As another example, some or all of next state constraints 248 may be changed automatically while vehicle 200 is in operation in an area near point of interest 202. For example, without limitation, next state constraints 248 may include a no-fly zone that is associated with an area of bad weather or another moving or otherwise changing condition that may be tracked automatically. In this case, the no-fly zone may be changed automatically while vehicle 200 is in operation in response to detected changes in the underlying condition upon which the no-fly zone is based.

Next state selector 244 may identify one or more of possible states 246 that satisfy next state constraints 248 and that have the best state values 253. In this case, the best state values 253 indicate possible states 246 that are best selections for next state 240. A list identifying one or more of possible states 246 that satisfy next state constraints 248 and that share the best state values 253 may be temporarily saved by next state selector 244 as list of best next states 254. The state values 253 of possible states 246 included in list of best next states 254 may be stored temporarily by next state selector 244 as value for best next state 256.

If list of best next states 254 identifies only one of possible states 246 with value of best next state 256, that one of possible states 246 is selected by next state selector 244 to be next state 240. However, if list of best next states 254 identifies more than one of possible states 246 with the same value of best next state 256, next state selector 244 may randomly select one of possible states 246 identified in list of best next states 254 to be next state 240. Next state selector 244 may include randomizer 258 for randomly selecting one of possible states 246 identified in list of best next states 254 to be next state 240. For example, without limitation, randomizer 258 may include a pseudo-random number generator.

Values 252 for attributes 250 of possible states 246 may be identified as ranges of values. In accordance with an illustrative embodiment, next state selector 244 may randomly select specific values for the attributes of next state 240 from ranges of values 252 provided for attributes 250 of the one of possible states 246 selected to be next state 240. For example, without limitation, next state selector 244 may use randomizer 258 to select specific values for the attributes of next state 240 from ranges of values 252.

After selecting next state 240, appropriate control signals may be generated and provided from automatic navigation system 204 to propulsion systems 216 and control systems 218 to control automatically the movement of vehicle 200 from current state 238 to next state 240. Alternatively, next state 240 may be provided as a recommendation from automatic navigation system 204 to operator 230. For example, without limitation, information identifying values of the various attributes of next state 240 may be provided from automatic navigation system 204 to operator 230 via communications systems 220. In this case, operator 230 may manually control the movement of vehicle 200 from current state 238 to next state 240.

After identifying next state 240, next state selector 244 may trigger state value updater 260 to update the one of state values 253 associated with the one of possible states 246 that was selected to be next state 240. For example, state value updater 260 may be configured to update the one of state values 253 by changing weights associated with the various attributes 250 for the one of possible states 246 that was selected to be next state 240. In any case, the one of state values 253 associated with the one of possible states 246 that was selected to be next state 240 may be updated to change the one of state values 253 in a manner so that the one of possible states 246 that was selected to be next state 240 is less likely to be selected again by next state selector 244 to be next state 240. Therefore, state value updater 260 may update state values 253 of possible states 246 in a manner so that automatic navigation system 204 may control the movement of vehicle 200 in a non-repeating pattern.

Automatic navigation system 204 may be engaged and disengaged a number of times while vehicle 200 is performing a mission in an area near point of interest 202. In accordance with an illustrative embodiment, automatic navigation system 204 may control the movement of vehicle 200 after automatic navigation system 204 is re-engaged in a manner such that any part of the pattern of movement of vehicle 200 as controlled by automatic navigation system 204 before automatic navigation system 204 was disengaged is not likely to be repeated. For example, without limitation, for any particular mission in the area near point of interest 202, state values 253 that are determined after operator 230 takes action to engage automatic navigation 234 may be held at their current values when operator 230 takes action to disengage automatic navigation 236. State values 253 that are held at their current values in this manner may again be used by next state selector 244 and updated by state value updater 260, as described above, when operator 230 takes action to again engage automatic navigation 234. As another example, operator 230 may be able to reset state values 253 of possible states 246 to initial values at any time.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, various functions of automatic navigation system 204 and remote control system 232 as described herein may be implemented in a number of data processing systems. These data processing systems may be located on vehicle 200, not located on vehicle 200 but in communication with vehicle 200 via communications systems 220, or both. The various functions of automatic navigation system 204 and remote control system 232 as described herein thus may be performed on vehicle 200, not on vehicle 200, or both on vehicle 200 and not on vehicle 200 in various combinations.

Figure 3:
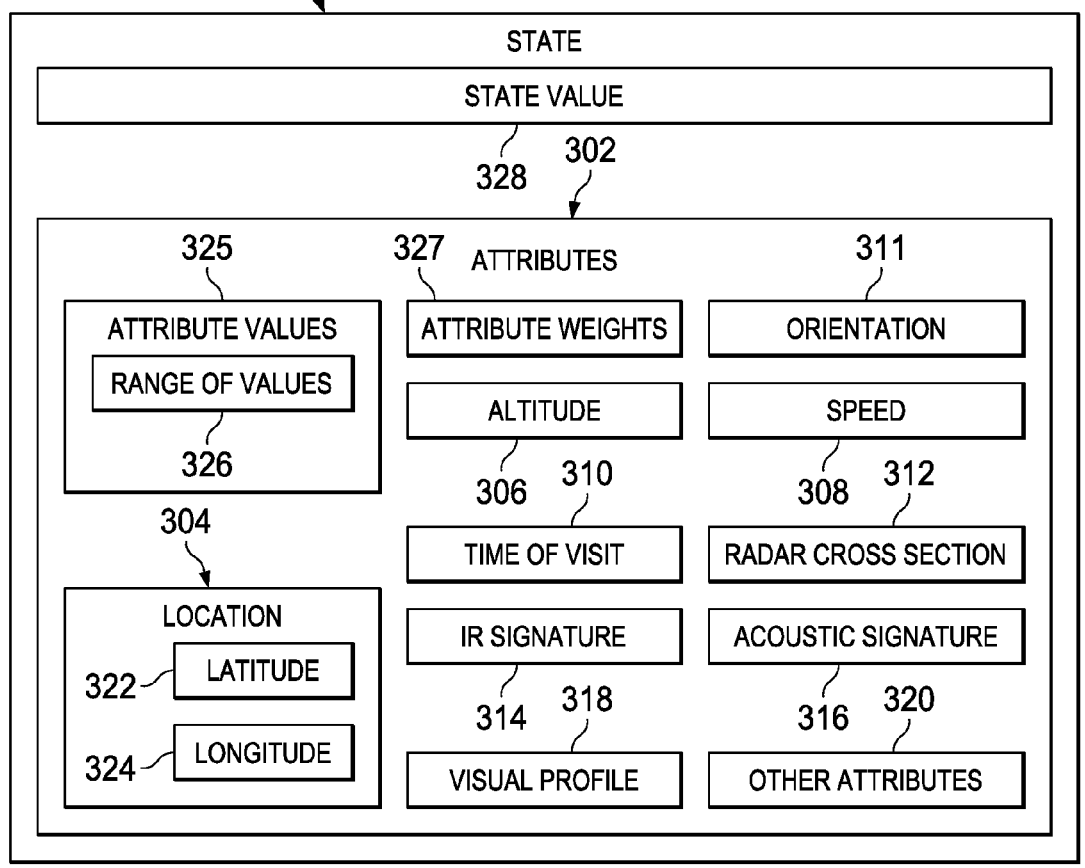
FIG. 3 is an illustration of a block diagram of a state of a vehicle in accordance with an illustrative embodiment.

Turning now to FIG. 3, an illustration of a block diagram of a state of a vehicle is depicted in accordance with an illustrative embodiment. In this example, state 300 is an example of one of possible states 246 in FIG. 2.

State 300 may be defined by various attributes 302. Attributes 302 may include various characteristics of a vehicle that may be related to the movement of the vehicle in an area near a point of interest. For example, without limitation, attributes 302 may include location 304, altitude 306, speed 308, time of visit 310, orientation 311, radar cross section 312, IR signature 314, acoustic signature 316, visual profile 318, other attributes 320, or various combinations of attributes.

Location 304 may be expressed in terms of latitude 322 and longitude 324, or in another appropriate manner. As another example, location 304 may be represented as a displacement, for example, the distance and direction of the vehicle from the point of interest. Time of visit 310 may include an indication of the last time that state 300 was the current state for the vehicle. Orientation 311 may refer to the orientation of the vehicle in two or three dimensional space. For example, without limitation, for an air vehicle, orientation 311 may include pitch, roll, and yaw. Radar cross section 312, IR signature 314, acoustic signature 316, visual profile 318, and other attributes 320 may be relative to a viewer at or near the point of interest or at another location.

Some of attributes 302 may be functions of other ones of attributes 302. For example, without limitation, radar cross section 312, IR signature 314, acoustic signature 316, visual profile 318, and other attributes 320, may be functions of orientation 311 or of other ones of attributes 302 or of various combinations of attributes 302.

Attribute values 325 may be specified for each of attributes 302 associated with state 300. Attribute values 325 may be specific values or may be expressed as range of vales 326, or both. For example, without limitation, location 304 may be defined by range of values 326 that defines an area around a specific point location.

Attribute weights 327 also may be associated with attributes 302. Attribute weights 327 may indicate how often ones of attribute values 325 have been selected for attributes 302 of state 300 when state 300 is selected to be the next state for a vehicle. Attribute weights 327 may be updated each time state 300 is selected to be the next state for the vehicle.

Attribute weights 327 may be used to identify state value 328 for state 300. State value 328 indicates the desirability of selecting state 300 to be the next state for a vehicle. For example, without limitation, state value 328 may be changed when state 300 is selected to be the next state for the vehicle in a manner that reduces the likelihood that state 300 will be selected again to be the next state for the vehicle. State value 328 may be used by an automatic navigation system in accordance with an illustrative embodiment to select the next state for the vehicle in a manner so that vehicle may be moved automatically in a non-repeating pattern in an area near a location of interest.

Figure 4:
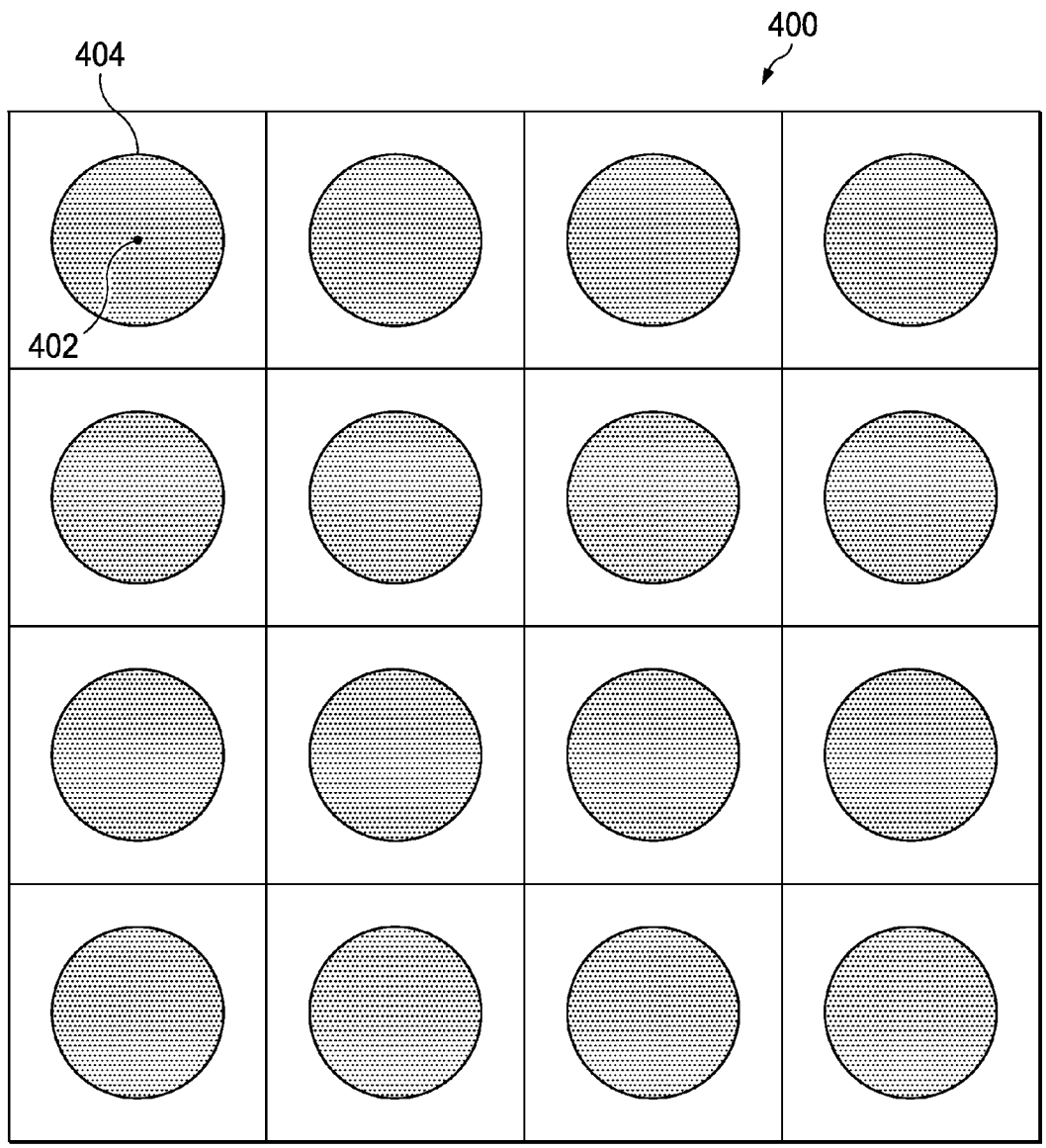
FIG. 4 is an illustration of a number of possible states for a vehicle in accordance with an illustrative embodiment.

Turning now to FIG. 4, an illustration of a number of possible states for a vehicle is depicted in accordance with an illustrative embodiment. In this example, possible states 400 are representations of an example of one implementation of possible states 246 in FIG. 2.

In this example, possible states 400 represent possible locations for a vehicle in an area near a point of interest. Possible states 400 may be identified by dividing the area near the point of interest into a two-dimensional grid. The size of each segment of the grid may be selected, for example, based on operational capabilities of the vehicle. Each segment of the grid therefore represents a possible state for the vehicle in the area near the point of interest.

In this example, the attribute values for the location attributes of possible states 400 are a range of values around a location at the center of each segment of the grid. For example, shaded area 404 around center point 402 defines the attribute value for the location attribute of one of possible states 400. Therefore, when this one of possible states 400 is selected to be the next state for the vehicle, the specific value of the location attribute for the next state to which the vehicle will be moved may be selected randomly from any location within shaded area 404.

Figure 5:
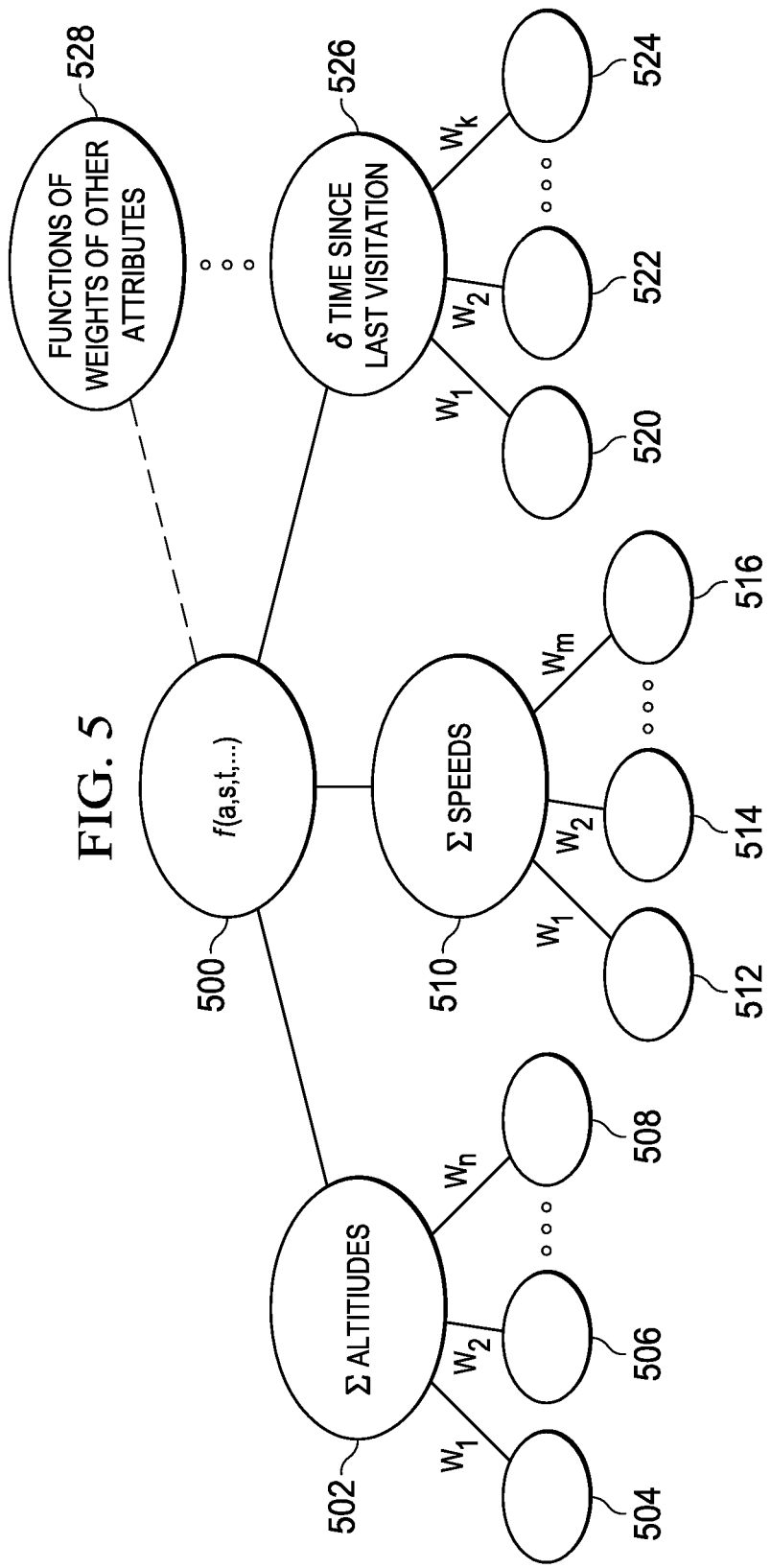
FIG. 5 is an illustration of a function for identifying the value of a state of a vehicle in accordance with an illustrative embodiment.

Turning now to FIG. 5, an illustration of a function for identifying the value of a state of a vehicle is depicted in accordance with an illustrative embodiment. In this example, function 500 is an example of one implementation of a function for identifying state values 253 of possible states 246 in FIG. 2.

In accordance with an illustrative embodiment, the value of a state is used to identify the desirability of selecting that state as the next state for a vehicle. In this example, the value of a state may be a function of weights that are assigned to the various attributes of the state. For example, the value of the state may be determined as function 500 of sum 502 of weights 504, 506, and 508 associated with altitude attributes of the state, sum 510 of weights 512, 514, and 516 associated with speed attributes of the state, Dirac delta function 526 of weights 520, 522, and 524 associated with a time since the last time that the vehicle was at the state, and functions 528 of weights associated with other attributes of the state. Weights 504, 506, 508, 512, 514, 516, 520, 522, and 524 may be selected and changed in a manner so that the value of the state as determined by function 500 changes each time the state is selected to be the next state for the vehicle to indicate that the state is less desirable to be selected again to be the next state for the vehicle. Function 500 may be a function of more, fewer, or different weights and functions of those weights than those shown by example in FIG. 5 and described by example herein.

For example, without limitation, a lower state value may indicate that a state is more desirable to be selected as the next state for a vehicle. In this example, the values of appropriate ones of weights 504, 506, 508, 512, 514, and 516 may be increased by a selected amount when the corresponding attributes associated with those weights are selected as attributes for the next state of the vehicle.

In this example, the value of Dirac delta function 526 may be the value of one of weights 520, 522, and 524 associated with a time since the last time that the vehicle was at the state. Weight 520 may be given a first value and associated with a first range of times. For example, without limitation, weight 520 may be given a value of 5 or another appropriate value and may be associated with a range of times of approximately 1-10 seconds or another range of times. Weight 522 may be given a second value that is smaller than the first value of weight 520 and may be associated with a second range of times that is longer than the first range of times associated with weight 520. For example, without limitation, weight 522 may be given a value of 3 or another appropriate value and may be associated with a range of times of approximately 10-60 seconds or another range of times. Weight 524 may be given a third value that is smaller than the second value of weight 522 and may be associated with a third range of times that is longer than the second range of times associated with weight 522. For example, without limitation, weight 524 may be given a value of 1 or another appropriate value and associated with the range of times over 60 seconds or another range of times. In this case, if the time since the last time that the vehicle was at the state is 11 seconds, then the value for Dirac delta function 526 used to determine the value of function 500 for the current time will be 3, the value of weight 522.

By selecting and adjusting weights 504, 506, 508, 512, 514, 516, 520, 522, and 524 in the manner described, the state value identified by function 500 is increased each time the state is selected to be the next state for the vehicle, thereby making it less likely that the state will be selected again to be the next state for the vehicle. Therefore, state values identified using function 500 may be used to control the movement of a vehicle in an area near a point of interest in an unpredictable manner in which the likelihood that the vehicle is controlled to move in the same state repeatedly is reduced.

Figure 6:
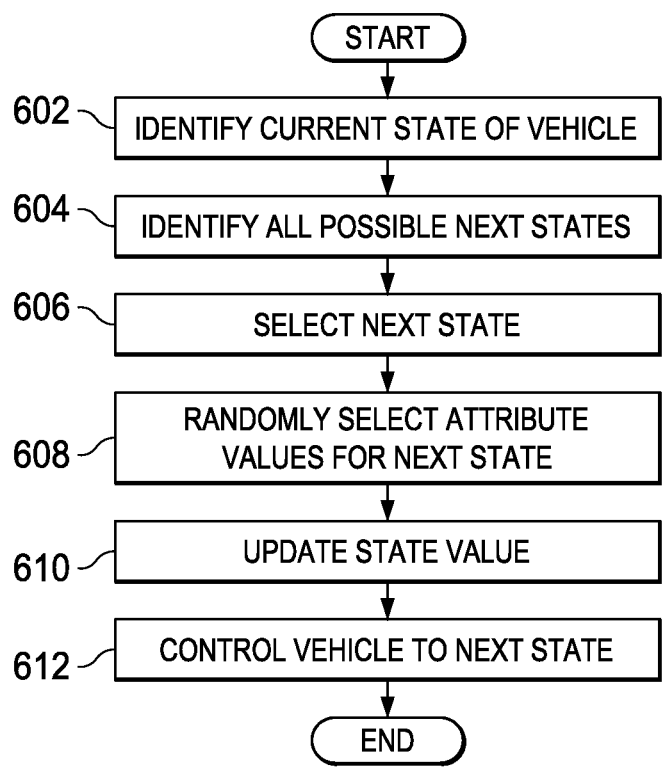
FIG. 6 is an illustration of a flowchart of a process for controlling the state of a vehicle in accordance with an illustrative embodiment.

Turning now to FIG. 6, an illustration of a flowchart of a process for controlling the state of a vehicle is depicted in accordance with an illustrative embodiment. The process of FIG. 6 may be implemented, for example, in automatic navigation system 204 in FIG. 2.

The process begins by identifying the current state of a vehicle (operation 602). For example, operation 602 may include identifying the current location and other attributes of the vehicle. All possible next states for the vehicle are identified (operation 604). For example, operation 604 may include identifying all possible next states for the vehicle from among all possible states for the vehicle. All possible next states may include the subset of all possible states to which the vehicle may be moved from the current state that satisfy any next state constraints.

A next state for the vehicle is selected from among the identified possible next states (operation 606). Operation 606 may include using state values of the possible next states that indicate the desirability of selecting the possible next states to be the next state for the vehicle. Values of attributes for the state selected to be the next state may be provided as ranges of values. In this case, specific attribute values for the next state may be randomly selected from the provided ranges of values (operation 608). The state value of the state selected to be the next state may be updated (operation 610). For example, operation 610 may include changing weights associated with the various attributes of the state selected to be the next state. The vehicle then may be controlled automatically to move from the current state to the selected next state (operation 612), with the process terminating thereafter.

Figure 7:
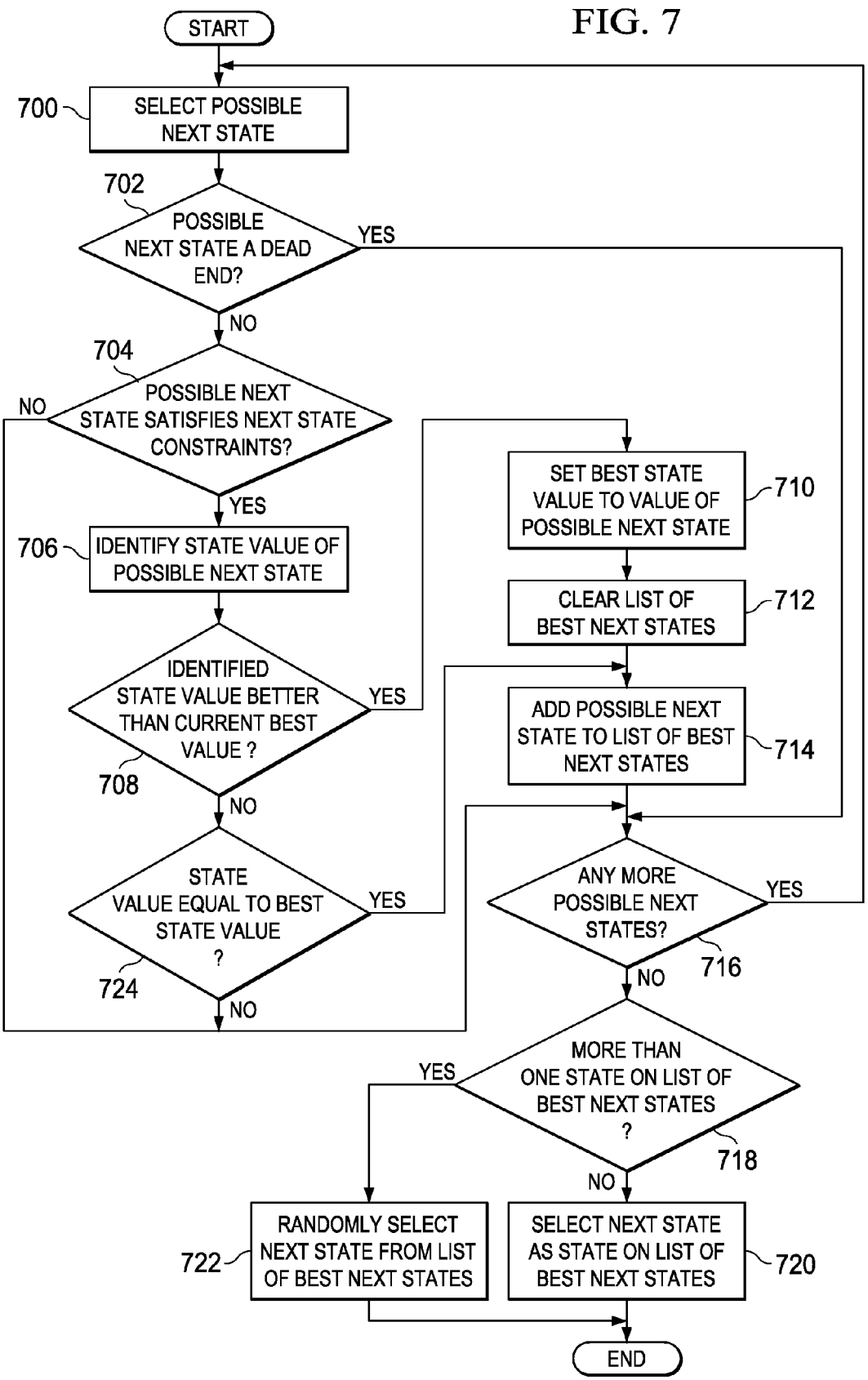
FIG. 7 is an illustration of a flowchart of a process for selecting the next state of a vehicle in accordance with an illustrative embodiment.

Turning now to FIG. 7, an illustration of a flowchart of a process for selecting a next state of a vehicle is depicted in accordance with an illustrative embodiment. In this example, the process illustrated in FIG. 7 is an example of a process for performing operation 606 in FIG. 6.

The process begins by selecting a possible next state from all possible next states that have been identified (operation 700). It then may be determined whether the next state is a dead end (operation 702). Operation 702 may include a look-ahead operation for determining whether the possible next state under consideration is a next state for the vehicle from which the vehicle may not be moved to any subsequent next state. Operation 702 may include looking at one or more steps into the future to determine whether the possible next state under consideration may ultimately result in a dead end state for the vehicle from which the vehicle may not be moved to any subsequent next state.

If the possible next state under consideration is not a dead end, it then may be determined whether the possible next state under consideration satisfies various next state constraints (operation 704). If it is determined that the possible next state under consideration does satisfy next state constraints, the state value of the possible next state under consideration is identified (operation 706). The state value may indicate the desirability of selecting the possible next state under consideration to be the next state for the vehicle.

It is then determined whether the identified state value of the possible next state under consideration is better than the current best value (operation 708). If it is determined that the value of the possible next state under consideration is better than the current best value, the best state value is reset to the identified value of the possible next state under consideration (operation 710), the list of best next states is cleared (operation 712), and the possible next state under consideration is added to the list of best next states (operation 714). It then may be determined whether there are any more possible next states to be considered (operation 716).

With reference again to operation 708, if it is determined that the identified state value of the possible next state under consideration is not better than the current best value, it may be determined whether the state value of the possible next state under consideration is equal to the current best state value (operation 724). If it is determined that the state value of the possible next state under consideration is equal to the current best state value, the process proceeds to operation 714 where the possible next state under consideration is added to the list of best next states. It then may be determined whether there are any more possible next states to be considered (operation 716).

Returning to operations 702, 704, and 724 if it is determined that the possible next state under consideration is a dead end, that the possible next state under consideration does not satisfy next state constraints, or that the state value of the possible next state under consideration is not better than or equal to the current best state value, the possible next state under consideration may not be selected as the next state for the vehicle. In these cases, the process proceeds directly to operation 716 to determine whether there are any more possible next states to consider.

If it is determined at operation 716 that there are more possible next states to be considered, the process returns to operation 700, and another of the possible next states is selected for consideration. Otherwise, if it is determine that there are not any more possible next states to be considered, it may be determined whether there is more than one state on the list of best next states (operation 718). If there is not more than one state on the list of best next states, the sole state on the list is selected as the next state (operation 720), with the process terminating thereafter. With reference again to operation 718, if it determined that there is more than one state on the list of best next states, the next state for the vehicle may be selected randomly from the number of states on the list of best next states (operation 722), with the process terminating thereafter.

Figure 8:
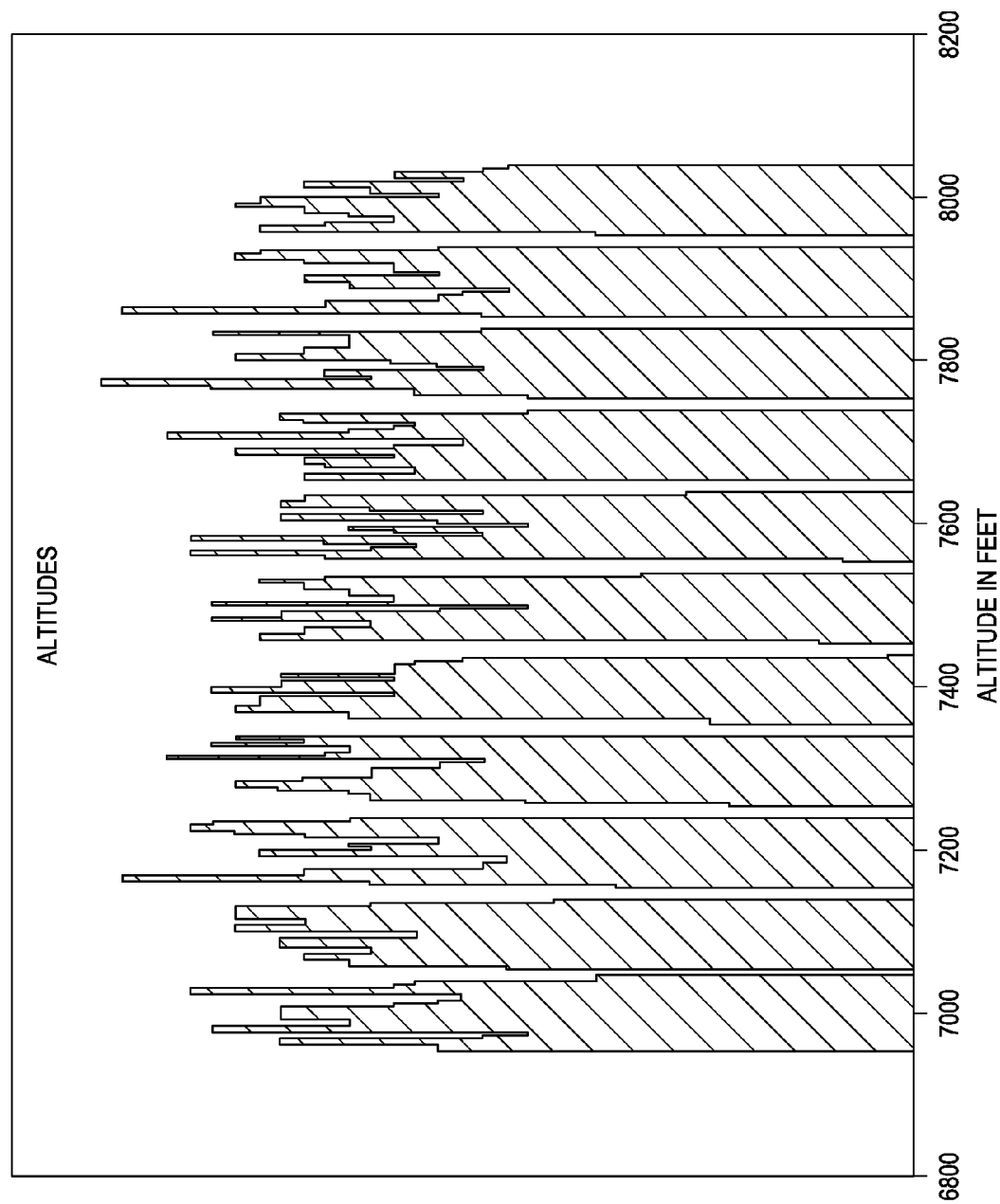
FIG. 8 is an illustration of a distribution of altitude values selected for the state of a vehicle in accordance with an illustrative embodiment.

Turning now to FIG. 8, an illustration of a distribution of altitude values selected for the state of a vehicle is depicted in accordance with an illustrative embodiment. The illustration of FIG. 8 shows a number of times that various altitudes are selected for an air vehicle in a particular state by simulation of an automatic navigation system in accordance with an illustrative embodiment. In this example, the attribute value for the altitude attribute of the state of the vehicle is provided as ranges of altitudes around 1000 foot increments from 7000 feet to 8000 feet. The particular altitude for the vehicle in the state is randomly selected from the provided ranges of altitude values. As a result, the specific altitude of the vehicle in the state is unpredictable.

Figure 9:
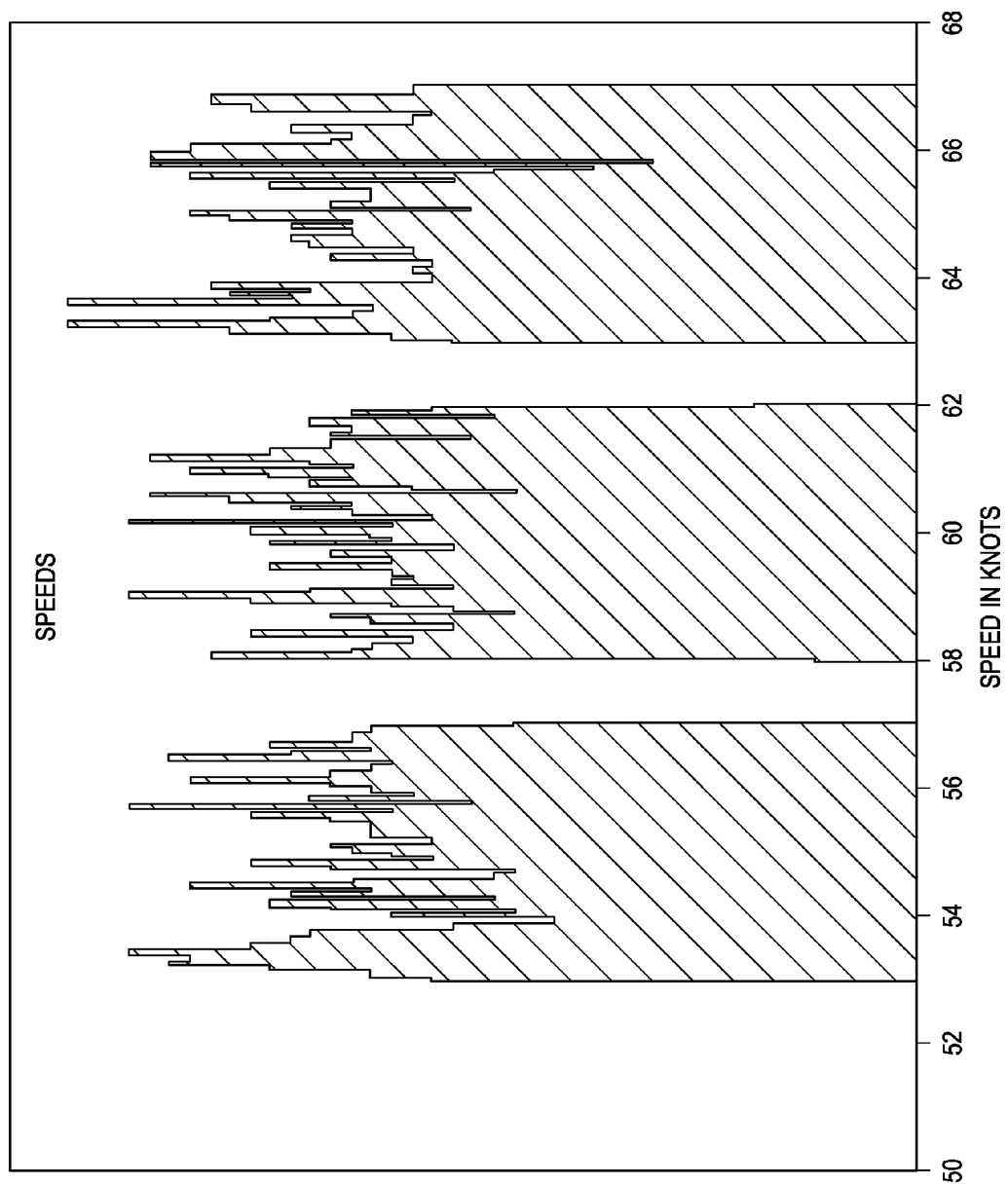
FIG. 9 is an illustration of a distribution of speed values selected for the state of a vehicle in accordance with an illustrative embodiment.

Turning now to FIG. 9, an illustration of a distribution of speed values selected for the state of a vehicle is depicted in accordance with an illustrative embodiment. The illustration of FIG. 9 shows a number of times that various speeds are selected for an air vehicle in a particular state by simulation of an automatic navigation system in accordance with an illustrative embodiment. In this example, the attribute value for the speed attribute of the state of the vehicle is provided as ranges of speed around 5 knot increments from 55 knots to 65 knots. The particular speed for the vehicle in the state is randomly selected from the provided ranges of speed values. As a result, the specific speed of the vehicle in the state is unpredictable.

Figure 10:
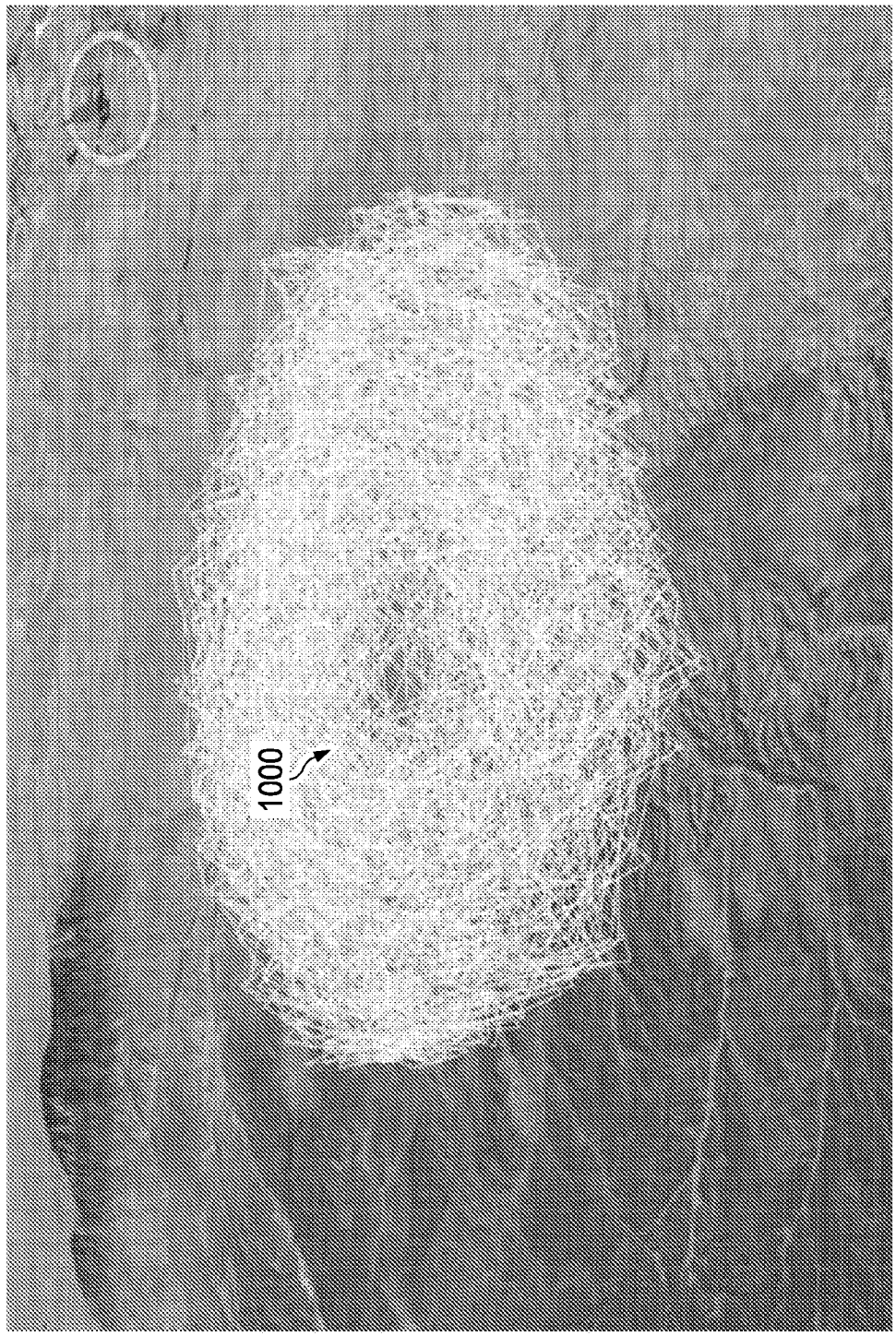
FIG. 10 is an illustration of a simulated flight path for an air vehicle in accordance with an illustrative embodiment.

Turning now to FIG. 10, an illustration of a simulated flight path for an air vehicle is depicted in accordance with an illustrative embodiment. In this example, flight path 1000 illustrates a flight path for an air vehicle performing a mission in an area near a point of interest as generated by a simulation of an automatic navigation system in accordance with an illustrative embodiment.

It may be seen that flight path 1000 is confined within altitude and location constraints that may be defined for the particular mission being performed by the air vehicle. However, within these constraints, the flight path is varying and unpredictable. An aircraft following flight path 1000 is less likely to be detected by hostile forces than an aircraft that is moved in a repeating and more predictable flight path around the point of interest.

Figure 11:
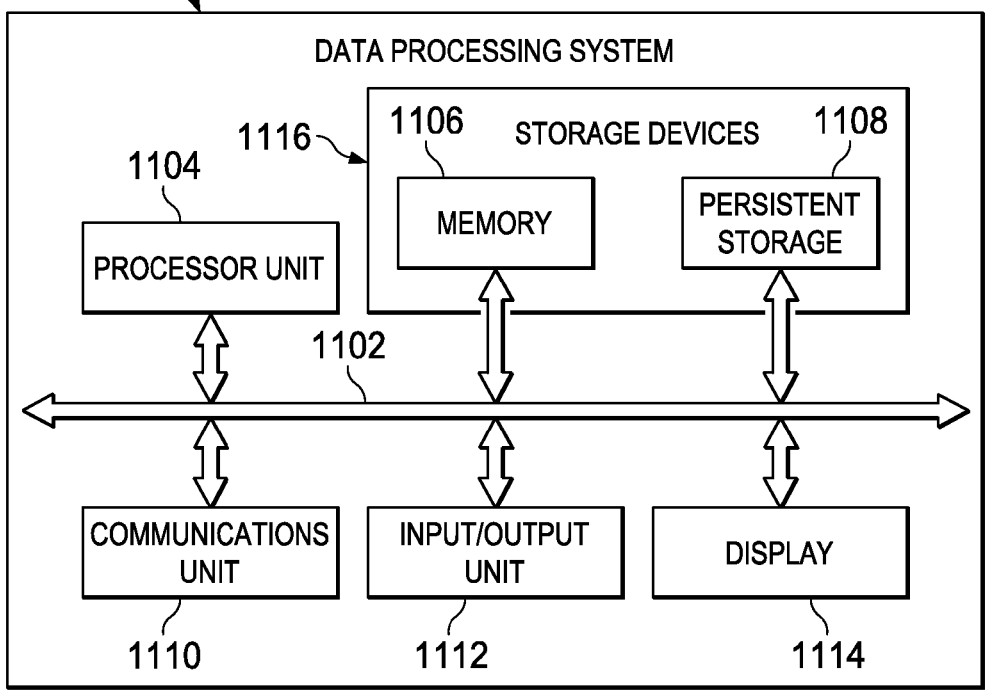
FIG. 11 is an illustration of a block diagram of a data processing system in accordance with an illustrative embodiment.

Turning now to FIG. 11, an illustration of a block diagram of a data processing system is depicted in accordance with an illustrative embodiment. In this example, data processing system 1100 is an example of one implementation of a data processing system for implementing automatic navigation system 204 in FIG. 2.

In this illustrative example, data processing system 1100 includes communications fabric 1102. Communications fabric 1102 provides communications between processor unit 1104, memory 1106, persistent storage 1108, communications unit 1110, input/output (I/O) unit 1112, and display 1114. Memory 1106, persistent storage 1108, communications unit 1110, input/output (I/O) unit 1112, and display 1114 are examples of resources accessible by processor unit 1104 via communications fabric 1102.

Processor unit 1104 serves to run instructions for software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and other suitable information either on a temporary basis or a permanent basis. Storage devices 1116 also may be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program instructions, program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, communications unit 1110 may include a number of devices that transmit data, receive data, or both transmit and receive data. Communications unit 1110 may be, for example, a modem or a network adapter, two network adapters, or some combination thereof. Further, a memory may be, for example, memory 1106, or a cache, such as that found in an interface and memory controller hub that may be present in communications fabric 1102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling movement of a vehicle, comprising:
   identifying a current state of the vehicle, wherein the current state comprises a current location of the vehicle;
   selecting, by a processor unit, a next state for the vehicle, wherein the next state comprises a next location for the vehicle;
   using a randomizer to randomly select a value between a range of values for an attribute of the next state of the vehicle; and
   controlling the movement of the vehicle to move the vehicle from the current state to the next state.

2. The method of claim 1, wherein the attribute of the next state of the vehicle is selected from the next location for the vehicle, an altitude of the vehicle, a speed of the vehicle, and an orientation of the vehicle.

3. The method of claim 1, wherein selecting the next state for the vehicle comprises:
   identifying possible next states for the vehicle;
   identifying state values for the possible next states; and
   selecting the next state from the possible next states using the state values.

4. The method of claim 3, wherein identifying the state values for the possible next states comprises identifying times that the vehicle was in the possible next states.

5. The method of claim 3, wherein selecting the next state comprises:
   using the randomizer to randomly select the next state from a plurality of the possible next states that have best state values.

6. The method of claim 3 further comprising:
   changing a one of the state values for a one of the possible next states selected to be the next state in response to selecting the next state.

7. The method of claim 1, wherein the vehicle is selected from an unmanned vehicle, a manned vehicle, an air vehicle, a land vehicle, a marine vehicle, and a submarine vehicle.

8. An apparatus, comprising:
   a processor unit configured to:
   identify a current state of a vehicle, wherein the current state comprises a current location of the vehicle;
   select a next state for the vehicle, wherein the next state comprises a next location for the vehicle; and use a randomizer to randomly select a value between a range of values for an attribute of the next state of the vehicle.

9. The apparatus of claim 8, wherein the attribute of the next state of the vehicle is selected from the next location for the vehicle, an altitude of the vehicle, a speed of the vehicle, and an orientation of the vehicle.

10. The apparatus of claim 8, wherein the processor unit is further configured to:
identify possible next states for the vehicle;
identify state values for the possible next states; and
select the next state from the possible next states using the state values.

11. The apparatus of claim 10, wherein the processor unit is configured to identify the state values for the possible next states by identifying times that the vehicle was in the possible next states.

12. The apparatus of claim 10, wherein the processor unit is configured to use the randomizer to randomly select the next state from a plurality of the possible next states that have best state values.

13. The apparatus of claim 10, wherein the processor unit is further configured to change a one of the state values for a one of the possible next states selected to be the next state in response to selecting the next state.

14. The apparatus of claim 8, wherein the vehicle is selected from an unmanned vehicle, a manned vehicle, an air vehicle, a land vehicle, a marine vehicle, and a submarine vehicle.

15. A method for controlling movement of a vehicle, comprising:
identifying a current state of the vehicle, wherein the current state comprises a current location of the vehicle;
identifying, by a processor unit, possible next states for the vehicle;
identifying, by the processor unit, state values for the possible next states, wherein the state values are a function of times that the vehicle was in the possible next states; and
selecting a next state for the vehicle from the possible next states using the state values, wherein the next state comprises a next location for the vehicle.

16. The method of claim 15 further comprising:
using a randomizer to randomly select a value between a range of values for an attribute of the next state of the vehicle, wherein the attribute is selected from the next location for the vehicle, an altitude of the vehicle, a speed of the vehicle, and an orientation of the vehicle.

17. The method of claim 15 further comprising:
automatically controlling the movement of the vehicle to move the vehicle from the current state to the next state based on a determination that an automatic navigation system is currently engaged; and
presenting the next state as a recommendation to an operator of the vehicle in response to a determination that the automatic navigation system is currently disengaged.

18. The method of claim 15, wherein selecting the next state for the vehicle comprises:
using a randomizer to randomly select the next state from a plurality of the possible next states that have best state values.

19. The method of claim 15 further comprising:
changing a one of the state values for a one of the possible next states selected to be the next state in response to selecting the next state.

20. The method of claim 15, wherein the vehicle is selected from an unmanned vehicle, a manned vehicle, an air vehicle, a land vehicle, a marine vehicle, and a submarine vehicle.

21. The method of claim 3, wherein the step of identifying the possible next states for the vehicle comprises looking ahead to remove a number of next states from the possible next states based on a determination that the vehicle could not be moved to a subsequent next state after moving to any of the number of next states.

22. The method of claim 17, wherein the step of automatically controlling the movement of the vehicle to move the vehicle from the current state to the next state is responsive to the automatic navigation system being re-engaged after being disengaged a plurality of times while the vehicle is performing a mission in an area near a point of interest.

* * * * *